(No Model.)  4 Sheets—Sheet 1.
G. L. McNUTT.
HAY LOADER.
No. 390,090.  Patented Sept. 25, 1888.
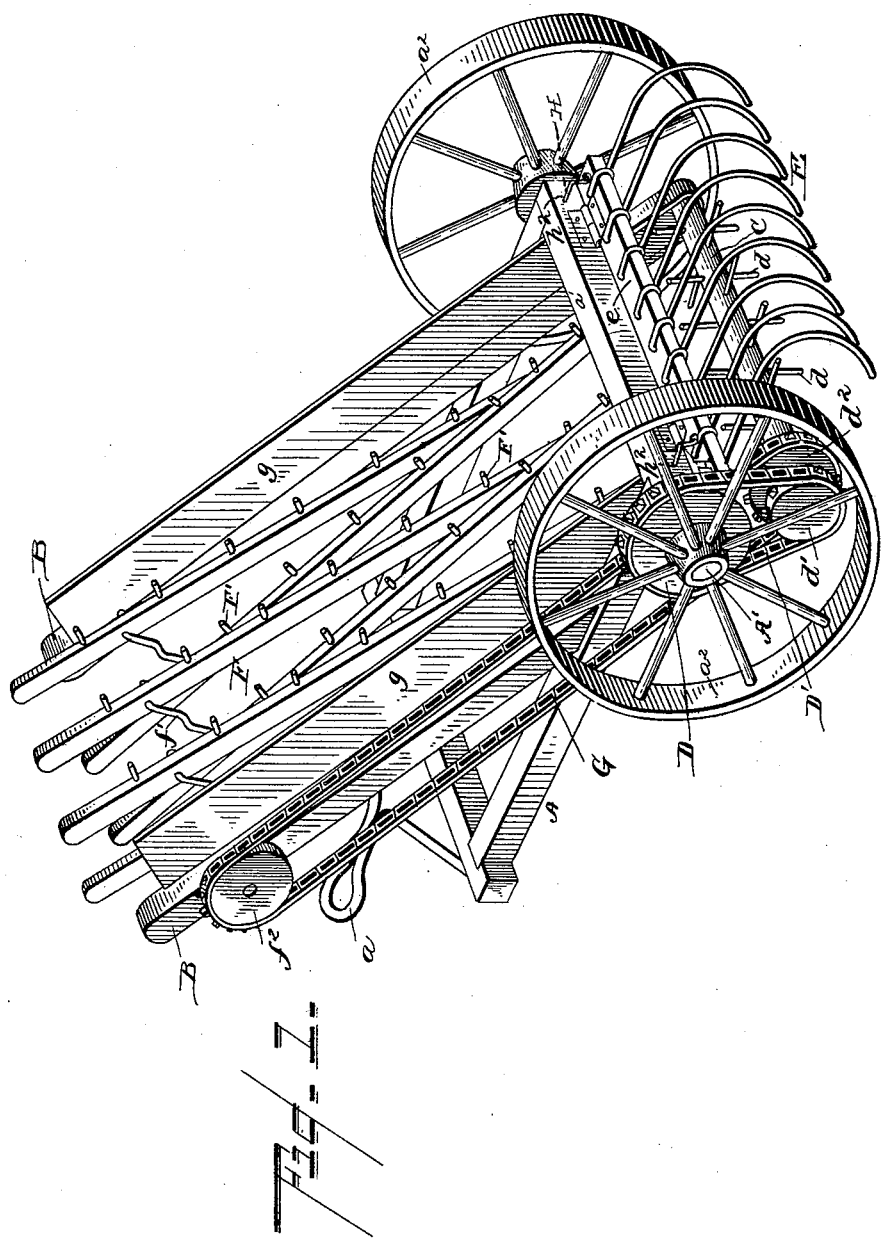
WITNESSES  
Francis N. Quinlan  
John Enders Jr.
INVENTOR  
George L. McNutt  
By [Attorneys]

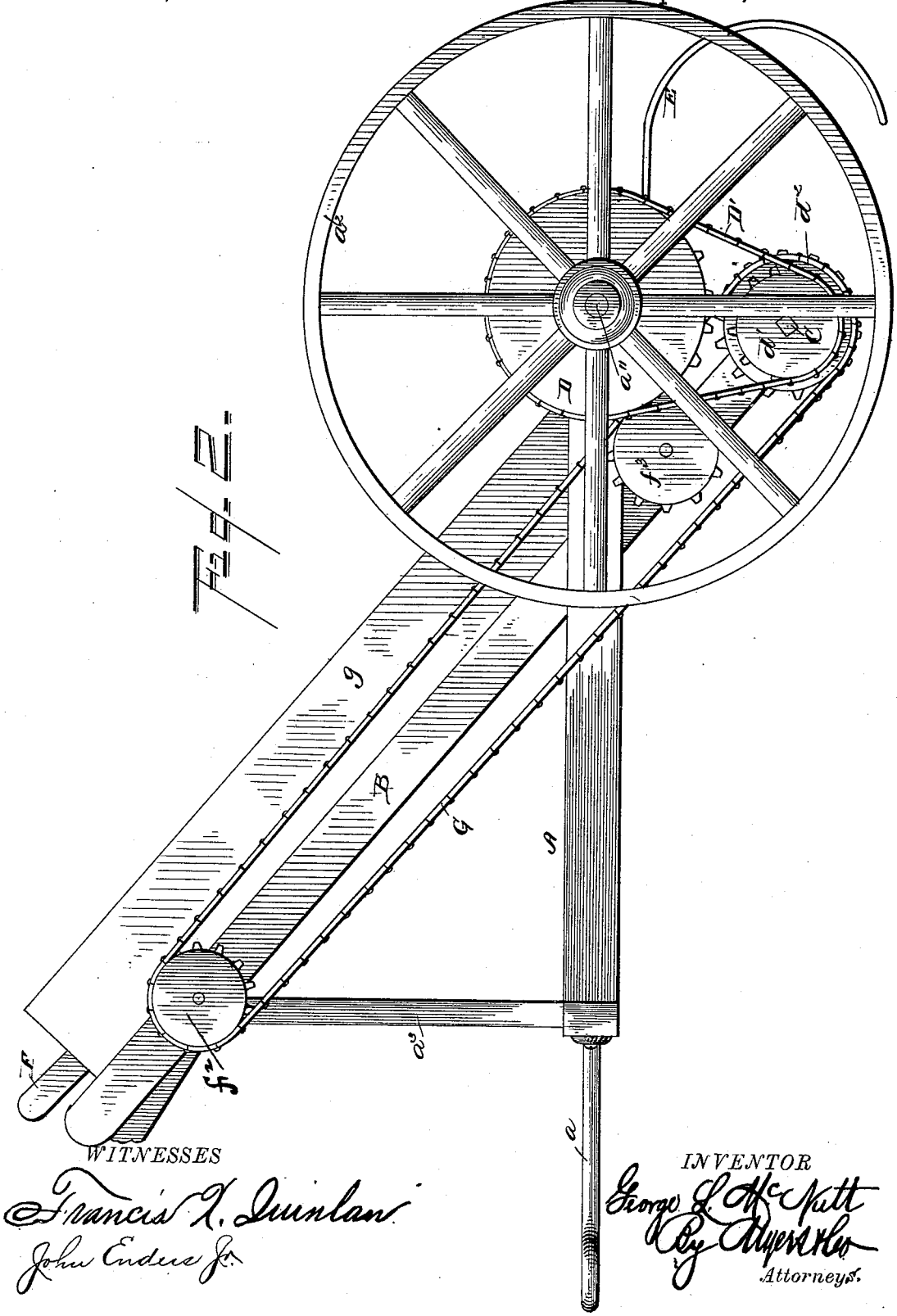

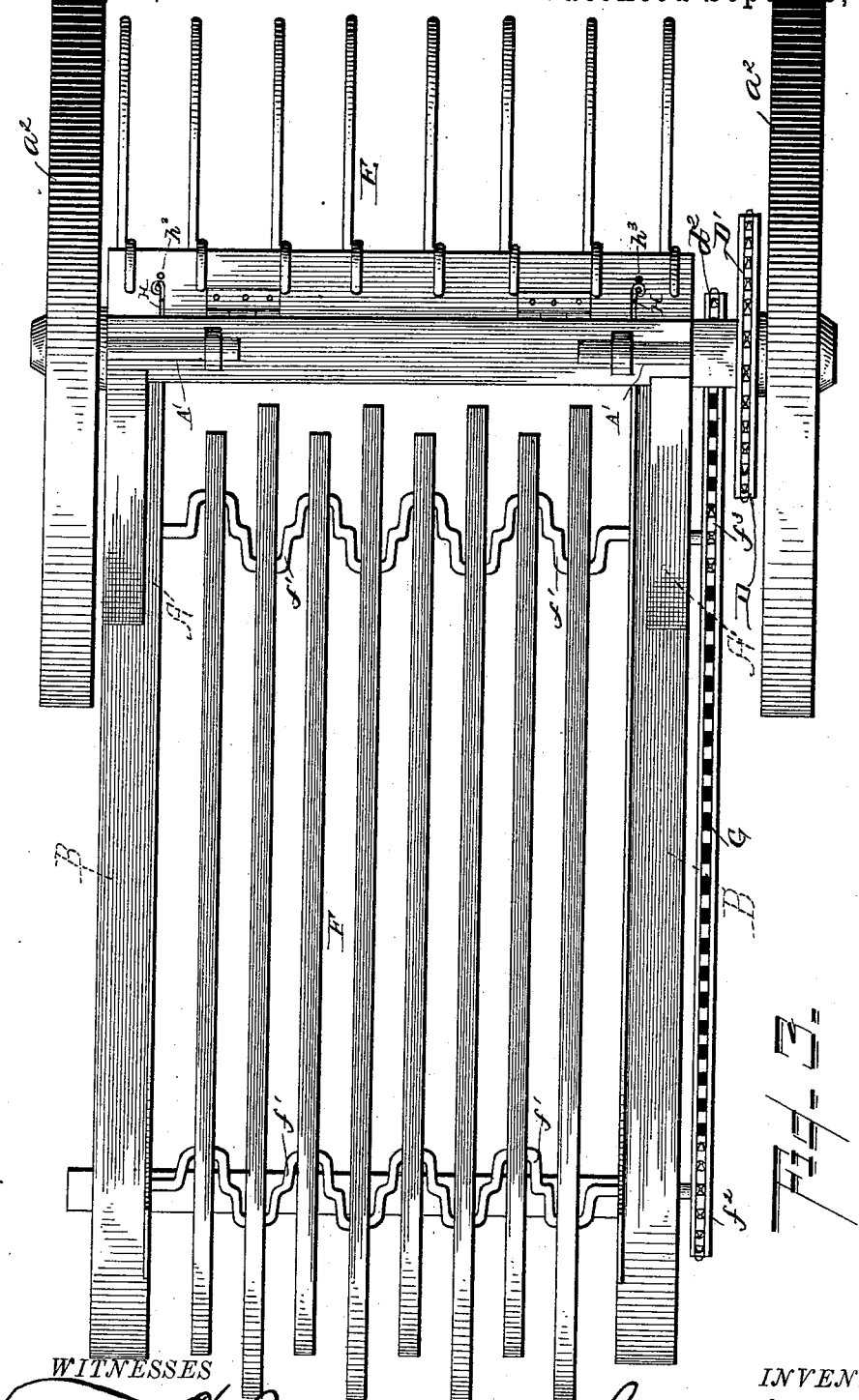

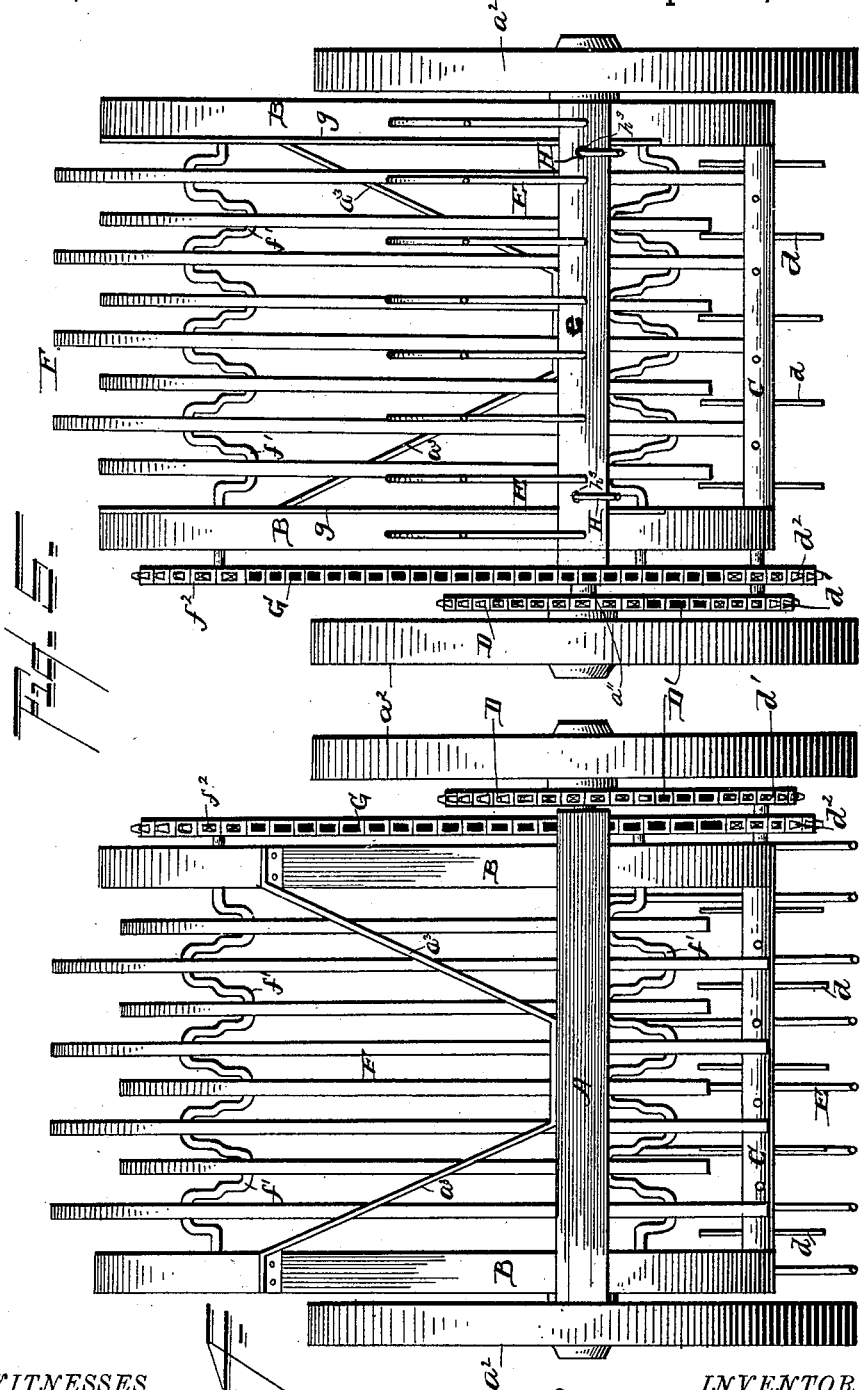

UNITED STATES PATENT OFFICE.

GEORGE L. McNUTT, OF FREMONT, OHIO.

HAY-LOADER.

SPECIFICATION forming part of Letters Patent No. 390,090, dated September 25, 1888.

Application filed February 11, 1888. Serial No. 263,669. (No model.)

*To all whom it may concern:*

Be it known that I, GEORGE L. McNUTT, a citizen of the United States of America, residing at Fremont, in the county of Sandusky and State of Ohio, have invented certain new and useful Improvements in Hay Rakes and Loaders, of which the following is a specification, reference being had therein to the accompanying drawings.

This invention pertains to certain new and useful improvements in hay rakes and elevators, having for its object a new and improved device of this class possessing advantages in point of durability, simplicity, and general efficiency; and the invention comprises the detail construction, combination, and arrangement of parts, substantially as hereinafter fully set forth, and particularly pointed out in the claim.

In the accompanying drawings, Figure 1 is a view in perspective of my invention. Fig. 2 is a side view thereof. Fig. 3 is a plan view. Fig. 4 is a front elevation, and Fig. 5 is a rear end view with the rake elevated.

Referring to the drawings, A indicates the main frame or body, to the front cross-bar of which is secured a suitable bent rod or bar, $a$, for connecting my device to the vehicle (not shown) to which the draft-horses are attached. The rear ends of the side bars of the frame A are connected by a cross-bar, $a'$, to the under side of which are secured two short axles, A' A', and upon these axles are the ordinary carrying-wheels, $a^2 a^2$.

B B are two inclined bars or standards rigidly secured near their lower rear ends to the side bars of the frame A, project at their upper forward ends over the front end of said frame, and are suitably held in position by an approximately V-shaped brace, $a^3$, attached to the main frame A.

C is a revolving shaft journaled at its ends in suitable boxes attached to the extreme lower rear ends of the bars or standards B, so as to be free to revolve therein. This shaft is provided with a series of outwardly-projecting teeth or fingers $d$, as shown, and upon the outer projecting end of this shaft is suitably secured a small sprocket-wheel, $d'$, adjacent to which, on the same projecting end, is a second sprocket-wheel, $d^2$. Upon the hub of one of the carrying-wheels is secured, so as to revolve therewith, a large sprocket-wheel, D, over which is passed an endless sprocket chain or belt, D', also passed under and around the sprocket-wheel $d'$ on the shaft C. To the rear cross-bar, $a'$, is secured, preferably by hinges, the rake head $e$ of the rake E, the teeth of which project rearwardly and downwardly, as shown.

F F represent a series of reciprocating bars provided in their upper surfaces with short projecting teeth F', and each of said bars is loosely secured at a point near each end upon crank-shafts $f' f'$, each of said shafts being journaled in the inclined bars or standards B, and are provided with approximately U-shaped bent portions, between the sides of which each of said reciprocating bars is designed to move, said bars being suitably secured on said crank-shafts, as before stated. Upon the outer ends of these crank-shafts $f' f'$, on one side of the machine, are secured corresponding sprocket-wheels $f^2 f^3$, as shown.

G is a second endless sprocket-chain passed around or caused to encompass the sprocket-wheel $d^2$ on the revolving shaft C and around the upper forward sprocket-wheel, $f^2$, said chain being also designed to bear against and engage the upper and lower teeth of the sprocket-wheel $f^3$.

To the upper surfaces of the inclined bars B B are secured suitable side strips or bars, $g$ $g$, to prevent the hay from falling over the sides of the elevator.

From the foregoing description it will be seen that when the carrying-wheels revolve motion will be transmitted through the sprocket-chain D' to the shaft C, causing said shaft to revolve in the same direction with said wheels and throwing the previously-mowed hay raked by the rake E onto the bars F, which, having an upward and forward reciprocating movement, will elevate the hay to the upper forward end thereof, from which it will drop or be deposited onto the wagon to which the loader is attached, as before stated.

The advantages of my invention will be apparent to those skilled in the art to which it appertains, and it will be seen that I provide simple and efficient means for elevating the hay, and also suitable means for operating or imparting the desired upward and forward reciprocating motion to the elevating-bars, whereby the elevation of the hay is greatly aided and the same accomplished in a short space of time. It will also be noticed that as one series of bars are descending the other series will be ascending, and thus take the hay from the descending bars and continue the elevation thereof without any backward movement.

It will be understood, of course, that without departing from the spirit of my invention I can make changes in the arrangement and disposition of the gearing for imparting motion to the revolving shaft and reciprocating bars, and, if desired, the sprocket-wheels and belts before described can be duplicated and placed on the other side of the machine, as is obvious.

H H are two right-angular pins, one end of each of which is designed to be inserted in apertures $h^2$ in the rear side of cross-bar $a'$, and the other or outer end is curved or turned to form an eye, which bears upon the rake-head, preventing the hay from raising the rake. These pins are also designed to hold the rake elevated, and said pins are inserted in apertures $h^3$ through the rake-head into the apertures $h^2$ in cross-bar $a'$, and the rake-head is thereby held elevated, as shown in Fig. 5.

I claim as my invention—

The combination, with the horizontally-disposed main frame having the cross-bar $a'$, provided with apertures $h^2$, of the inclined side bars secured to said frame, the guide strips or bars attached to said side bars, the crank-shafts, the series of reciprocating bars having teeth and journaled on said shafts, the revolving shaft journaled in the lower ends of said inclined side bars in rear of said reciprocating bars and having radial projecting teeth, the sprocket-wheels on the journals of said shafts, the stub-axles, the carrying-wheels, one of which has a sprocket-wheel secured to its hub, the endless chains engaging said sprocket-wheels, the rake having its head provided with apertures $h^3$, and the right-angular pins, substantially as shown and described.

In testimony whereof I affix my signature in presence of two witnesses.

GEORGE L. McNUTT.

Witnesses:
B. R. DUDROW,
R. I. FRANKS.